(12) United States Patent
Li et al.

(10) Patent No.: US 12,247,097 B2
(45) Date of Patent: Mar. 11, 2025

(54) ROOM TEMPERATURE IONIC LIQUID CURING AGENT

(71) Applicant: Evonik Operations GmbH, Essen (DE)

(72) Inventors: Jian Li, Beijing (CN); Lei Wang, Shanghai (CN)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 17/867,220

(22) Filed: Jul. 18, 2022

(65) Prior Publication Data

US 2022/0356298 A1 Nov. 10, 2022

Related U.S. Application Data

(62) Division of application No. 16/309,154, filed as application No. PCT/CN2016/087248 on Jun. 27, 2016, now abandoned.

(51) Int. Cl.
  *C08G 59/54* (2006.01)
  *C08G 59/24* (2006.01)
  (Continued)

(52) U.S. Cl.
  CPC .......... *C08G 59/54* (2013.01); *C08G 59/245* (2013.01); *C08G 59/4207* (2013.01);
  (Continued)

(58) Field of Classification Search
  CPC .. C08G 59/54; C08G 59/245; C08G 59/4207; C08G 59/423; C08G 59/4261;
  (Continued)

(56) References Cited

U.S. PATENT DOCUMENTS 4,229,563 A 10/1980 Foscante et al.
8,519,091 B2 8/2013 Raymond
(Continued)

FOREIGN PATENT DOCUMENTS

CN 1549837 A 11/2004
CN 102432830 A 5/2012
(Continued)

OTHER PUBLICATIONS

Commemorative Publication Editorial Committee for 30th Anniversary of the Founding (Ed.), "Review of Epoxy Resin—The Basics I", 1st edition, The Japan Society of Epoxy Resin Technology, 2003, pp. 124 to 125 and 138 to 139.
(Continued)

*Primary Examiner* — Shane Fang
(74) *Attorney, Agent, or Firm* — Andrew H. Chung; Linda S. Li; Jason S. Ngui

(57) ABSTRACT

Epoxy curing agents are disclosed having an epoxy curing agent comprising at least one room temperature ionic liquid salt, the room temperature ionic liquid salt being a reaction product of (a) at least one polyalkylene polyamine compound represented by formula (I):

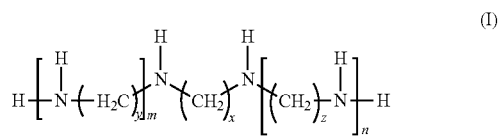

wherein x, y, and z are integers of 2 and 3, m and n and integers of 1-3; and (b) an organic acid having pKa (the negative of the logarithm of the acid dissociation constant) less than 6. The liquid salt is a stable liquid at a temperature
(Continued)

Isothermal curing curve of Example 7 the hot fast cure composition by DSC.

greater than 15° C. Curable epoxy-based compositions including the curing agent and articles formed by the curable epoxy-based compositions are also disclosed.

19 Claims, 1 Drawing Sheet

(51) Int. Cl.
| | | |
|---|---|---|
| C08G 59/42 | (2006.01) | |
| C08G 59/50 | (2006.01) | |
| C08G 59/58 | (2006.01) | |
| C09D 5/00 | (2006.01) | |
| C09D 163/00 | (2006.01) | |
| C09J 163/00 | (2006.01) | |
| C09K 3/10 | (2006.01) | |

(52) U.S. Cl.
CPC ....... *C08G 59/423* (2013.01); *C08G 59/4261* (2013.01); *C08G 59/4284* (2013.01); *C08G 59/5026* (2013.01); *C08G 59/504* (2013.01); *C08G 59/5073* (2013.01); *C08G 59/58* (2013.01); *C09D 5/002* (2013.01); *C09D 163/00* (2013.01); *C09J 163/00* (2013.01); *C09K 3/10* (2013.01); *C09K 2200/0647* (2013.01)

(58) Field of Classification Search
CPC ............ C08G 59/4284; C08G 59/5026; C08G 59/504; C08G 59/5073; C08G 59/58; C09D 5/002; C09D 163/00; C09K 3/10; C09K 2200/0647
See application file for complete search history.

(56) References Cited

U.S. PATENT DOCUMENTS

| | | | |
|---|---|---|---|
| 2009/0029175 A1* | 1/2009 | Vedage | C08G 59/5026 |
| | | | 252/182.13 |
| 2011/0152448 A1 | 6/2011 | Corley et al. | |
| 2014/0296381 A1 | 10/2014 | Schrötz et al. | |

FOREIGN PATENT DOCUMENTS

| | | |
|---|---|---|
| CN | 102858837 A | 1/2013 |
| CN | 103974993 A | 8/2014 |
| EP | 0737702 A2 | 10/1996 |
| JP | 2012036409 A | 2/2012 |
| WO | 2011075217 A1 | 6/2011 |
| WO | 2013081895 A2 | 6/2013 |
| WO | 2015144391 A1 | 10/2015 |

OTHER PUBLICATIONS

The Chemical Society of Japan (Ed.), "Chemistry Handbook—The Basics 11", 5th edition, Maruzen, 2004, pp. 333, 336 to 337 and 340 to 342.

Ninomiya Akio, Touei Kyoji, "Acid Dissociation Constant of Fatty Acid Dibasic Acid", The Chemical Society of Japan, 1969, vol. 90, No. 7, pp. 655 to 658.

Kameoka Hiroshi, Okada Noboru (Ed.), "Organic Chemistry (vol. I)", 6th edition, Sangyo Tosha Co., Ltd., 1989, p. 163 and the attached table.

* cited by examiner

Isothermal curing curve of Example 7 the hot fast cure composition by DSC.
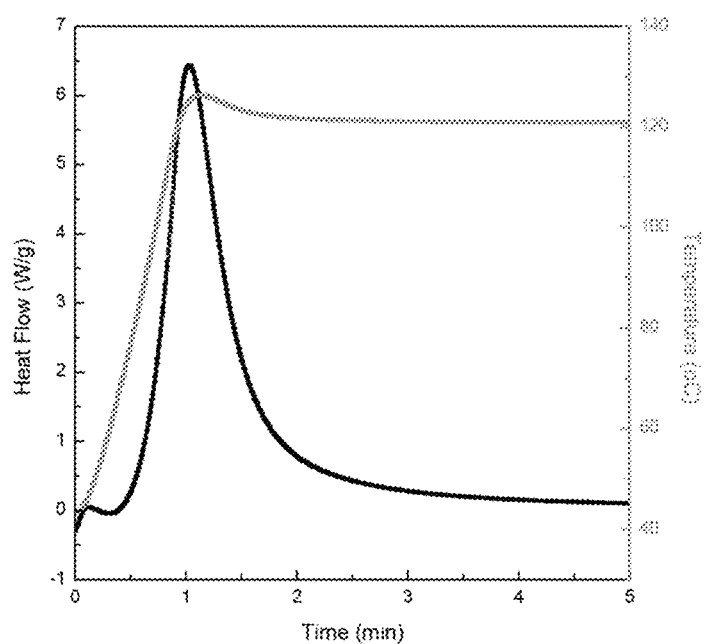

ROOM TEMPERATURE IONIC LIQUID CURING AGENT

BACKGROUND OF THE INVENTION

The present invention is related to room temperature ionic liquids as an amine epoxy cure agent and to curable epoxide-based compositions containing such liquid salt compounds, and also to methods of making such compounds, and compositions.

Epoxies are known for their excellent adhesion, chemical and heat resistance, good-to-excellent mechanical properties, and good electrical insulating properties. Cured epoxy resin systems have found extensive applications ranging from adhesives, composites, coatings, construction products, and flooring products. Specific examples include two-components epoxy adhesive for automotive, electronics, aerospace and the general industries, epoxy composite using carbon fiber and fiberglass reinforcements, protective coatings for metal surface, and construction products for concrete, cementitious or ceramic substrates, often referred to as civil engineering applications, such as formulations for concrete flooring.

Cured epoxy resin systems consist of two components that can chemically react with each other to form a cured epoxy, which is a hard, duroplastic material. The first component is an epoxy resin and the second component is a curing agent, often referred to a hardener. Epoxy resins are substances or mixtures which contain epoxide groups. The curing agents include compounds which are reactive to the epoxide groups of the epoxy resins, such as amines, carboxylic acid, and mercaptanes (H. Lee and K. Neville "Handbook of Epoxy Resins" McGraw Hill, New York, 1967, pages 5-1 to 5-24). The epoxy resins can be cross-linked or cured by curing agents. The curing process is the chemical reaction of the epoxide groups in the epoxy resins and the reactive groups in the curing agents. The curing converts the epoxy resins, which have a relatively low molecular weight, into relatively high molecular weight materials by chemical addition of the curing agents to the epoxy resins. Additionally, the curing agent can contribute to many of the properties of the cured epoxy.

Fast curing and/or cold curing epoxy systems under ambient temperature are very useful in many applications like adhesives, composites, electronics, floorings and coatings (also include waterborne compositions). Modified amines, like Mannich bases, amine adduct and amine accelerated by tertiary amine (and its salt), (alkyl) phenol or Lewis acid, are commonly used in these applications when cured under ambient temperature. Another epoxy system that is known is an accelerated polymercaptan and is considered a fast ambient cure epoxy agent.

Accelerated polymercaptan, like CAPCURE® 3-800 accelerated by Ancamine® K54 curing agents, suffer from the drawback that accelerated polymercaptan is limited to some special applications in which amine chemistry cannot meet the cure speed requirement due to its strong odor, poor resistance to hot water and poor physical properties. Likewise, Mannich bases and cure agents accelerated by (alkyl) phenol suffer from the drawback that they may result in environmental, health and safety (EHS) issues due to the free (alkyl) phenol. Amine, amine adduct accelerated by tertiary amines and also Mannich bases show fast cure speed while it will result in an early vitrification and leave a certain period of fragile stage without the help of certain loading of plasticizer which will dramatically decrease the heat resistance of the system. Acid is a type of efficient accelerator for amine hardener to improve the reactivity of amine with epoxy, while most organic acids and their amine salts are solid form without solvent. So the loading of acid is limited to a low level to avoid solid separating from the mixture. Some strong lewis acids (e.g. BF3) may react fast, but the resulting cured epoxy has little strength and is practically useless.

International Publication WO2009080209A discloses a phenalkamine blended with a salted polyamine or a salted polyamine-epoxy adduct to form a cure agent for epoxy resin, wherein at least one-third primary amine groups are blocked by reacting with an epoxy, and are "salted" by adding an acidic hydrogen donor (salicylic acid (SA) or bisphenol A (BPA)). However, there are no details recited on the acid concentration or solvent is utilized in the disclosed process.

International Publication WO2013081895A discloses an amine/salicylic acid salt in liquid form, while all the amine groups in 2-methylpentanediamine (MPMD) to form the salt are primary and no secondary amine are disclosed inside. In WO2013081895A, it is also mentioned that some amines form a liquid salt with salicylic acid (SA) like Jeffamine D230, Jeffamine D400, trimethylpentamethylene diamine (TMD) and 1,3 diaminomethyl cyclohexane (1,3 BAC). All these amines also only contain primary amine groups and the loading of SA is required to be low to avoid insoluble material.

International Publication WO2014028158A discloses a hardener composition in which the accelerator was partially neutralized by salicylic acid to replace Mannich bases. While the neutralization process of WO2014028158A incorporates the first modifier (high boiling point solvent) and the first amine, the cycloaliphatic amines all only contain primary amine groups.

International Publication WO2015144391 discloses a process (high pressure RTM/HP-RTM) to manufacture composite. For the hardener part, the accelerator p-toluenesulfonic acid (P-TSA) is dissolved in 1, 3 BAC as a liquid form while when P-TSA loading is high (>10 wt %) water is needed to prevent precipitation. The amine 1, 3 BAC of WO2015144391 only contains primary amine groups.

The disclosure of the foregoing publications including patents and patent applications is hereby incorporated by reference.

As noted above, epoxy resins are crosslinked or cured in order to develop certain characteristics. However, many applications suffer from slow cure or insufficient cure at ambient or low temperature and/or suffer from drawbacks in the quality of the cured article. There is a need in the industry to develop amine-epoxy compositions that are fast cure at ambient and low temperature that do not suffer from the drawbacks of known curing agents. And more important, the room temperature ionic liquid is in liquid form which will benefit the blending process and storage.

BRIEF SUMMARY OF THE INVENTION

The present disclosure includes a fast curing and/or cold curing epoxy system epoxy curing agent. The epoxy curing agent includes room temperature ionic liquids (RTIL) as building blocks or accelerator for amine epoxy cure agent and to curable epoxide-based compositions containing such liquid salt compounds, and also to methods of making such compounds, and compositions.

In an exemplary embodiment, the present disclosure includes an epoxy curing agent having at least one room temperature ionic liquid salt. The room temperature ionic liquid salt is a reaction product of (a) at least one polyalkylene polyamine compound represented by formula (I):

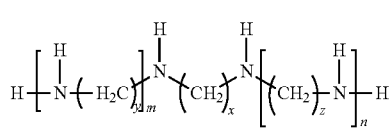

wherein x, y, and z are integers of 2 and 3, m and n and integers of 1-3; and (b) an organic acid having pKa (the negative of the logarithm of the acid dissociation constant) less than 6.

The inventive salt comprises a liquid salt that is a stable liquid at a temperature greater than 15° C., stable at a temperature greater than 15 C and up to about 150 C; and in some cases greater than 15 C up to about 200 C. By "liquid" it is meant that the salt has a viscosity of about 1000 cps to about 300,000 cps at a temperature of about 25° C. By "stable" it is meant that the liquid salt can be storage stable (maintain liquid state) for more than 1 month at a temperature greater than about 15° C. The inventive salt can have an amine value of about 200 mgKOH/g to about 1600 mgKOH/g, and in some cases about 400 mgKOH/g to about 900 mgKOH/g.

In another exemplary embodiment, the present disclosure includes an epoxy composition. The epoxy composition includes curable epoxy-based composition comprising (i) at least one epoxy resin and (ii) an epoxy curing agent having at least one room temperature ionic liquid salt. The room temperature ionic liquid salt is a reaction product of (a) at least one polyalkylene polyamine compound represented by formula (I):

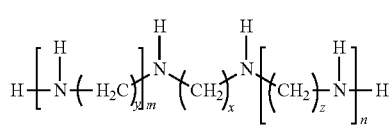

wherein x, y, and z are integers of 2 and 3, m and n and integers of 1-3; and an organic acid having pKa less than 6. The liquid salt is a stable liquid at a temperature greater than 15° C.

In another exemplary embodiment, the present disclosure includes a method for forming a cured epoxy. The method for forming the cured epoxy includes mixing the curable epoxy-based composition, according to the present disclosure.

In another exemplary embodiment, the present disclosure includes a cured epoxy resin comprising the contact product of the curable epoxy-based composition, according to the present disclosure.

In another exemplary embodiment, the present disclosure includes an article formed from the contact product of the curable epoxy-based composition, according to the present disclosure.

The various embodiments of the invention can be used alone or in combinations with each other.

Other features and advantages of the present invention will be apparent from the following more detailed description of the preferred embodiment, taken in conjunction with the accompanying drawings which illustrate, by way of example, the principles of the invention.

BRIEF DESCRIPTION OF SEVERAL VIEWS OF THE DRAWINGS

The FIGURE is a graphical representation showing an isothermal curing curve of an example according to the present disclosure.

DETAILED DESCRIPTION OF THE INVENTION

Provided are room temperature ionic liquids as epoxy curing agent and epoxy-curing compositions containing such liquid salt compounds, and methods of making such compounds, and compositions. Room temperature ionic liquids epoxy curing agents, according to the present disclosure, are cost effective, provide fast cure especially at ambient and low temperatures for epoxy, and are suitable as sole fast curing agents or co-curing agents with other amine epoxy curing agent. Suitable applications include, but are not limited to, adhesives, electronics, composite, coatings, primers, sealants, curing compounds, construction products, flooring products, and composite products. Further, such adhesive, coatings, primers, sealants, or curing compounds can be applied to metal, FRP composite, plastics or cementitious substrates. The epoxy hardener, according to the present disclosure, includes several significant advantages, like high reactivity with epoxy at room temperature and low temperature, easy use for using as a liquid, reduced or eliminated blushing, low-odor and high Glass transition temperature (Tg). Another key benefit of the room temperature ionic liquid salt is that it does not induce much homopolymerization of epoxy resin and can contribute very good mechanical properties.

Embodiments of the present disclosure include epoxy curing agents. The epoxy curing agents include at least one room temperature ionic liquid salt, the room temperature ionic liquid salt being a reaction product of (a) at least one polyalkylene polyamine compound represented by formula (I):

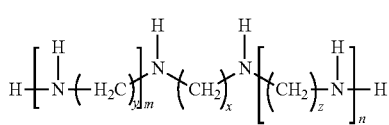

wherein x, y, and z are integers of 2 and 3, m and n and integers of 1-3, and (b) an organic acid having pKa less than 6, wherein the liquid salt is a stable liquid at a temperature greater than 15° C.

The reaction product of the polyalkylene polyamine compound and the organic acid described above, according to the present disclosure, is a room temperature ionic liquid and is in a liquid state at room temperature. "Room temperature ionic liquid" (RTIL) salt, as utilized herein, includes a salt in which the ions are poorly coordinated, which results in these compounds being in liquid form at temperatures is a stable liquid at a temperature greater than about 15° C., including at room temperature.

In certain embodiments, the at least one polyalkylene polyamine compound is a mixture of dissimilar polyalkylene polyamine compounds. Examples of suitable dissimilar polyalkylene polyamine compounds include, but are not limited to combinations of N,N'-bis(3-aminopropyl) ethylenediamine (Am4) and N,N,N'-tris(3-aminopropyl) ethylenediamine (Am5) or Am4 and triethylenetetramine (TETA) or Am4 and tetraethylenepentamine (TEPA).

In certain embodiments, the at least one polyalkylene polyamine compound is a derivative of polyalkylene polyamine according to formula (I). Suitable derivatives include, but are not limited to, alkylated polyalkylene polyamine, benzylated polyalkylene polyamine, hydroxyalkylated polyalkylene polyamine, and polyalkylene polyamine adduct of formula (I).

It will be recognized by those skilled in the art that polyalkylene polyamines containing 4 or more nitrogen atoms are generally available as complex mixtures. In these complex mixtures, it is typical to see a majority of the compounds in the mixture have the same number of nitrogen atoms. In these reaction mixtures, side products in these mixtures are often called congeners. For example, complex mixtures of triethylenetetramine (TETA) contain, not only linear TETA, but also tris-aminoethylamine, N,N'-bis-aminoethylpiperazine, and 2-aminoethylaminoethylpiperazine.

The organic acid for use with the present disclosure includes any organic acids having the negative of the logarithm of the acid dissociation constant less than 6 (Pka<6). Suitable organic acids include, but are not limited to, p-toluenesulfonic acid (p-TSA) (Pka~-1.34), trifluoromethanesulfonic acid (CF3SO3H) (Pka~-14), fluorosulfuric acid (FSO3H) (Pka~-15.1), salicylic acid (Pka~2.97), trifluoroacetic acid (TFA) (Pka~-0.25), 2-ethylhexanoic acid (EHA) (Pka~4.82), tetrafluoroboric acid (HBF4) (Pka~-4.9), thiocyanic acid (HSCN) (Pka~-4), and combinations thereof.

In certain embodiments of the present disclosure, the molar ratio of component (b) to component (a) in a reaction mixture forming the reaction product is from greater than 0 to 1.8. In a particularly suitable embodiment, the molar ratio of component (b) to component (a) in a reaction mixture forming the reaction is from 0.3 to 1.3.

The reaction to form the room temperature ionic liquid salt, according to the present disclosure, includes contacting at least one polyalkylene polyamine compound with organic acid having a pKa less than 6. The reaction of the at least one polyalkylene polyamine compound and organic acid having a pKa less than 6 may proceed at a reaction temperature of about 50° C. to about 150° C., about 60° C. to about 120° C., or about 65° C. to about 110° C. for 1 to 10 hours or 2 to 8 hours or 3 to 7 hours. Water and solvent are removed from the composition under high vacuum at 110° C.

Generally, the curing agent composition has an amine hydrogen equivalent weight (AHEW) based on 100% solids from about 15 to about 500. Further, the curing agent composition can have an AHEW based on 100% solids from about 20 to about 300, or from about 30 to about 200, or from about 40 to about 150.

Additionally, curing agent compositions described herein can be solvent-based. Alternatively, in another aspect of the present disclosure, these compositions can further comprise at least one diluent, such as, for example, an organic solvent, or an organic or inorganic acid. Appropriate organic solvents are well known to those skilled in the art of amine formulation chemistry. Exemplary organic solvents suitable for use in the present disclosure include, but are not limited to, benzyl alcohol, butanol, toluene, xylene, methyl ethyl ketone, and the like, or combinations thereof. Non-limiting examples of organic and inorganic acids are acetic acid, sulfamic acid, lactic acid, salicylic acid, sebacic acid, boric acid, phosphoric acid, and the like, or combinations thereof. Such acids can increase the curing speed of the curing agent composition.

The curing agent compositions also can be further modified with monofunctional epoxides, such as, for example, phenyl glycidyl ether, o-cresyl glycidyl ether, p-tert-butylphenyl glycidyl ether, n-butyl glycidyl ether, and other similar glycidyl ethers or esters. Further, curing agent compositions disclosed herein can be blended with other commercially available curing agents. Such commercially available curing agents include, but are not limited to, solvent based, solvent free or water-based curing agents, which can be employed in a blend to target specific properties, such as cure rate, drying speed, hardness development, clarity, and gloss.

In another embodiment of the present disclosure, a curable epoxy-based compositions contains (i) epoxy resin, (ii) above room temperature liquid salt compounds, (iii) optional second amines, (iv) optional modifier, and (v) optional acrylate (v). For example, the curable epoxy-based composition, in accordance with the present disclosure, includes curable epoxy-based composition including (i) at least one epoxy resin, and (ii) an epoxy curing agent comprising at least one room temperature ionic liquid salt, the room temperature ionic liquid salt being a reaction product of (a) at least one polyalkylene polyamine compound represented by formula (I):

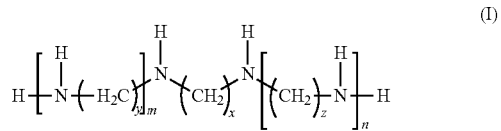

wherein x, y, and z are integers of 2 and 3, m and n and integers of 1-3 and (b) an organic acid having a pKa less than 6 and the liquid salt is a stable liquid at a temperature greater than 15° C. Optionally, various additives can be present in the compositions or formulations used to produce fabricated articles, dependent upon the desired properties. These additives can include, but are not limited to, solvents (including water), accelerators, plasticizers, fillers, fibers, such as, glass or carbon fibers, pigments, pigment dispersing agents, rheology modifiers, thixotropes.

Epoxy resins (i) for use in the curable epoxy-based compositions include substances or mixtures which contain epoxide groups. Examples of suitable epoxy resins include, but are not limited to, bisphenol-A diglycidyl ethers (DGEBA), bisphenol-F diglycidyl ethers (BFDGE), and epoxy novolacs. The epoxy resin can be optionally diluted by reactive diluent like C12/C14 glycidyl ether, butanediol diglycidyl ether, hexanediol-diglycidyl ether.

Curing agent compositions, in accordance with the present disclosure, can further comprise at least one (iii) second amine in addition to the room temperature ionic liquid salt. Second amines include at least one nitrogen atom, and may be a primary amine, a secondary amine, a tertiary amine, a quaternary amine or derivative thereof. One example of a second amine includes a multifunction amine. Multifunctional amine, as used herein, describes compounds with amine functionality and which contain three (3) or more active amine hydrogens.

In certain embodiments of the present disclosure, (iii) second amines are included in the curable epoxy-based composition or in the curing agent. Examples of second amines include, but are not limited to polyalkylene polyamine, cycloaliphatic amine, aromatic amine, poly(alkylene oxide) diamine or triamine, Mannich base derivative, polyamide derivatives and combinations thereof. Other suitable second amines include, but are not limited to diethanolamine, morpholine, and PC-23 as secondary amines, tris-dimethylaminomethylphenol (commercially available as ANCAMINE® K-54 from Air Products and Chemicals, Inc.), DBU, TEDA as tertiary amines. In addition, the curable epoxy-based composition or curing agent may include combinations of these amines or amine derivatives. The second amine provides properties of being a co-cure agent, toughener, diluent and/or accelerator. Suitable second amines include, but are not limited to, aminoethylpiperazine, isophoronediamine (IPDA), 4,4'-methylenebis(cyclohexylamine) PACM, hydrogenated metaxylylene diamine (referred to commercially as 1,3-BAC), 3,3'-dimethyl-4,4'-diaminodicyclohexyl methane (DMDC), polyether amine, and combinations thereof. The compositional range of (iii) second amine in the epoxy curing agent may be, for example, from 0 to about 95 wt % or from about 15 to about 45 wt %.

Non-limiting examples of multifunctional amines having three (3) or more active amine hydrogens that are within the scope of the present disclosure include, but are not limited to, an aliphatic amine, a cycloaliphatic amine, an aromatic amine, a poly(alkylene oxide) diamine or triamine, a Mannich base derivative of an aliphatic amine, a cycloaliphatic amine, or an aromatic amine, a polyamide derivative of an aliphatic amine, a cycloaliphatic amine, or an aromatic amine with a dimer fatty acid or a mixture of a dimer fatty acid and fatty acid, an amidoamine derivative of an aliphatic amine, a cycloaliphatic amine, or an aromatic amine with a fatty acid, an amine adduct derivative of an aliphatic amine, a cycloaliphatic amine, or an aromatic amine with a glycidyl ether of bisphenol A or bisphenol F or an epoxy novolac resin, and the like, or any combination thereof.

More than one multifunctional amine can be used in the compositions of the present disclosure. For example, the at least one multifunctional amine can comprise an aliphatic amine and a Mannich base derivative of a cycloaliphatic amine. Also, the at least one multifunctional amine can comprise one aliphatic amine and one different aliphatic amine.

Exemplary aliphatic amines include polyethyleneamines (EDA, DETA, TETA, TEPA, PEHA, and the like), polypropyleneamines, aminopropylated ethylenediamines (Am3, Am4, Am5, and the like), aminopropylated propylenediamines, 1,6-hexanediamine, 3,3,5-trimethyl-1,6-hexanediamine, 3,5,5-trimethyl-1,6-hexanediamine, 2-methyl-1,5-pentanediamine, and the like, or combinations thereof. In one aspect of this invention, the at least one multifunctional amine is EDA, DETA, TETA, TEPA, PEHA, propylenediamine, dipropylenetriamine, tripropylenetetramine, N-3-aminopropyl ethylenediamine (Am3), N,N'-bis(3-aminopropyl) ethylenediamine (Am4), N,N,N'-tris(3-aminopropyl) ethylenediamine (Am5), N-3-aminopropyl-1,3-diaminopropane, N,N'-bis(3-aminopropyl)-1,3-diaminopropane, N,N,N'-tris(3-aminopropyl)-1,3-diaminopropane, or any combination thereof. Additionally, the poly(alkylene oxide) diamines and triamines commercially available under the JEFFAMINE® trademark from Huntsman Corporation, are useful in the present invention. Illustrative examples include, but are not limited to, JEFFAMINE® D-230, JEFFAMINE® D-400, JEFFAMINE® D-2000, JEFFAMINE® D-4000, JEFFAMINE® T-403, JEFFAMINE® EDR-148, JEFFAMINE® EDR-192, JEFFAMINE® C-346, JEFFAMINE® ED-600, JEFFAMINE® ED-900, JEFFAMINE® ED-2001, and the like, or combinations thereof. Cycloaliphatic and aromatic amines include, but are not limited to, 1,2-diaminocyclohexane, 1,3-diaminocyclohexane, 1,4-diaminocyclohexane, aminopropylcyclohexylamine (APCHA), hydrogenated ortho-toluenediamine, hydrogenated meta-toluenediamine, metaxylylene diamine, hydrogenated metaxylylene diamine (referred to commercially as 1,3-BAC), isophorone diamine, norbornane diamines, 3,3'-dimethyl-4,4'-diaminodicyclohexyl methane, 4,4'-diaminodicyclohexyl methane, 2,4'-diaminodicyclohexyl methane, a mixture of methylene bridged poly(cyclohexyl-aromatic) amines, and the like, or combinations thereof. The mixture of methylene bridged poly(cyclohexyl-aromatic)amines is abbreviated as either MBPCAA or MPCA, and is described in U.S. Pat. No. 5,280,091, which is incorporated herein by reference in its entirety. In one aspect of the present disclosure, the at least one multifunctional amine is a mixture of methylene bridged poly(cyclohexyl-aromatic)amines (MPCA).

Mannich base derivatives can be made by the reaction of the above described aliphatic amines, cycloaliphatic amines, or aromatic amines with phenol or a substituted phenol and formaldehyde or paraformaldehyde. An exemplary substituted phenol used to make Mannich bases with utility in the present disclosure is cardanol, which is obtained from cashew nut shell liquid. Alternatively, Mannich bases can be prepared by an exchange reaction of a multifunctional amine with a tertiary amine containing a Mannich base, such as tris-dimethylaminomethylphenol (commercially available as ANCAMINE® K-54 from Air Products and Chemicals, Inc.) or bis-dimethylaminomethylphenol. Polyamide derivatives can be prepared by the reaction of an aliphatic amine, cycloaliphatic amine, or aromatic amine with dimer fatty acid, or mixtures of a dimer fatty acid and a fatty acid. Amidoamine derivatives can be prepared by the reaction of an aliphatic amine, cycloaliphatic amine, or aromatic amine with fatty acids. Amine adducts can be prepared by the reaction of an aliphatic amine, cycloaliphatic amine, polyamide, or aromatic amine with an epoxy resin, for example, with the diglycidyl ether of bisphenol-A, the diglycidyl ether of bisphenol-F, or epoxy novolac resins. The aliphatic, cycloaliphatic, polyamide, and aromatic amines also can be adducted with monofunctional epoxy resins, such as phenyl glycidyl ether, cresyl glycidyl ether, butyl glycidyl ether, other alkyl glycidyl ethers, and the like.

In certain embodiments of the present disclosure, optional (iv) modifiers are included in the epoxy curing agent. The optional (iv) modifier may be any nonreactive components which is compatible with curable epoxy-based composition. For example, the modifier may dilute, accelerate and/or toughen the epoxy curing agent. Suitable modifiers include, but are not limited to, benzyl alcohol, furfuryl alcohol, polyethylene glycol, and combinations thereof. The compositional range of (iv) modifier in the epoxy curing agent may be, for example, from 0 to about 50 wt % or from about 5 to about 40 wt %.

In certain embodiments of the present disclosure, an optional (v) acrylate is included in the curable epoxy-based composition. Suitable (v) acrylate may include mono functional, di-functional, multifunctional acrylate and any polymer with acrylate end group. These acrylates react with the amino group via Michael addition reaction which possesses higher reactivity than the epoxy-amine addition reaction. The (v) acrylate may act as a curable resin, diluent and/or toughener in the curable epoxy-based composition. Suitable (v) acrylates include, but are not limited to, lauryl acrylate (LA), 1,6-hexanediol diacrylate (HDDA), trimethylolpropanetriacrylate (TMPTA), poly(alkylene oxide) diacrylate, polyurethane diacrylate (PUDA), polyester diacrylate and combinations thereof. The compositional range of (v) acrylate in the epoxy resin may be, for example, from 0 to 100 wt %, or from about 10 to about 60 wt %.

In yet another aspect of this invention, a method for forming a cured epoxy includes mixing the curable epoxy-based composition, according to the present disclosure. Epoxy compositions of the present disclosure comprise the contact product of a curing agent composition and an epoxy composition comprising at least one epoxy resin. One suitable type of epoxy resin is a multifunctional epoxy resin. Multifunctional epoxy resin, as used herein, describes compounds containing 2 or more 1,2-epoxy groups per molecule. Epoxide compounds of this type are well known to those of skill in the art and are described in Y. Tanaka, "Synthesis and Characteristics of Epoxides", in C. A. May, ed., *Epoxy Resins Chemistry and Technology* (Marcel Dekker, 1988), which is incorporated herein by reference in its entirety.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions or formulations described herein. Still further, two or more of the components of the contact product may react to form a reaction product as well as other components that further react in order for compounds comprising the composition. Combining additional materials or components can be done by any method known to one of skill in the art.

The relative amount chosen for the epoxy composition versus that of the curing agent composition, or hardener, can vary depending upon, for example, the end-use article, its desired properties, and the fabrication method and conditions used to produce the end-use article. For instance, in coating applications using certain epoxy compositions, incorporating more epoxy resin relative to the amount of the curing agent composition, can result in coatings which have increased drying time, but with increased hardness and improved appearance as measured by gloss. In some adhesive applications, more cure agent will be used to improve the cure speed or flexibility. Epoxy compositions of the present disclosure generally have stoichiometric ratios of epoxy groups in the epoxy composition to amine hydrogens in the curing agent composition ranging from about 1.5:1 to about 0.5:1. For example, such epoxy compositions can have stoichiometric ratios of about 1.5:1, about 1.4:1, about 1.3:1, about 1.2:1, about 1.1:1, about 1:1, about 0.9:1, about 0.8:1, or about 0.7:1, or about 0.6:1, or about 0.5:1. In another aspect, the stoichiometric ratio ranges from about 1.3:1 to about 0.6:1. In yet another aspect, the stoichiometric ratio ranges from about 1.2:1 to about 0.6:1. In still another aspect, the stoichiometric ratio ranges from about 1.1:1 to about 0.9:1.

One class of epoxy resins suitable for use in the present disclosure comprises the glycidyl ethers of polyhydric phenols, including the glycidyl ethers of dihydric phenols. Illustrative examples include, but are not limited to, the glycidyl ethers of resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane (commercially known as bisphenol A), bis-(4-hydroxyphenyl)-methane (commercially known as bisphenol F, and which may contain varying amounts of 2-hydroxyphenyl isomers), and the like, or any combination thereof. Additionally, advanced dihydric phenols of the following structure also are useful in the present disclosure:

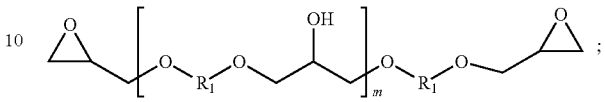

where m is an integer, and R1 is a divalent hydrocarbon radical of a dihydric phenol, such as those dihydric phenols listed above. Materials according to this formula can be prepared by polymerizing mixtures of a dihydric phenol and epichlorohydrin, or by advancing a mixture of a diglycidyl ether of dihydric phenol. While in any given molecule the value of m is an integer, the materials are invariably mixtures which can be characterized by an average value of m, which is not necessarily a whole number. Polymeric materials with an average value of m between 0 and about 7 can be used in one aspect of the present disclosure.

In another aspect, epoxy novolac resins, which are the glycidyl ethers of novolac resins, can be used as multifunctional epoxy resins in accordance with the present disclosure. In yet another aspect, the at least one multifunctional epoxy resin is a diglycidyl ether of bisphenol-A (DGEBA), an advanced or higher molecular weight version of DGEBA, a diglycidyl ether of bisphenol-F, an epoxy novolac resin, or any combination thereof. Higher molecular weight versions or derivatives of DGEBA are prepared by the advancement process, where excess DGEBA is reacted with bisphenol-A to yield epoxy terminated products. The epoxy equivalent weights (EEW) for such products range from about 450 to 3000 or more. Because these products are solid at room temperature, they are often referred to as solid epoxy resins.

DGEBA or advanced DGEBA resins are often used in coating formulations due to a combination of their low cost and generally high performance properties. Commercial grades of DGEBA having an EEW ranging from about 174 to about 250, and more commonly from about 185 to about 195, are readily available. At these low molecular weights, the epoxy resins are liquids and are often referred to as liquid epoxy resins. It is understood by those skilled in the art that most grades of liquid epoxy resin are slightly polymeric, since pure DGEBA has an EEW of 174. Resins with EEW's between 250 and 450, also generally prepared by the advancement process, are referred to as semi-solid epoxy resins because they are a mixture of solid and liquid at room temperature. Generally, multifunctional resins with EEW's based on solids of about 160 to about 750 are useful in the present invention. In another aspect, the multifunctional epoxy resin has an EEW in a range from about 170 to about 250.

Depending upon the end-use application, it can be beneficial to reduce the viscosity of the compositions of the present disclosure by modifying the epoxy component. For example, the viscosity can be reduced to allow an increase in the level of pigment in a formulation or composition while still permitting easy application, or to allow the use of a higher molecular weight epoxy resin. Thus, it is within the scope of the present disclosure for the epoxy component, which comprises at least one multifunctional epoxy resin, to further comprise a monofunctional epoxide. Examples of monoepoxides include, but are not limited to, styrene oxide, cyclohexene oxide, ethylene oxide, propylene oxide, butylene oxide, and the glycidyl ethers of phenol, cresols, tert-butylphenol, other alkyl phenols, butanol, 2-ethylhexanol, C4 to C14 alcohols, and the like, or combinations thereof. The multifunctional epoxy resin can also be present in a solution or emulsion, with the diluent being water, an organic solvent, or a mixture thereof.

Compositions of the present disclosure can be used to produce various articles of manufacture. Depending on the requirements during the manufacturing of or for the end-use application of the article, various additives can be employed in the formulations and compositions to tailor specific properties. These additives include, but are not limited to, solvents (including water), accelerators, plasticizers, fillers, fibers, such as, glass or carbon fibers, pigments, pigment dispersing agents, rheology modifiers, thixotropes, flow or leveling aids, surfactants, defoamers, biocides, or any combination thereof. It is understood that other mixtures or materials that are known in the art can be included in the compositions or formulations and are within the scope of the present disclosure.

The present disclosure also is directed to articles of manufacture comprising the compositions disclosed herein. For example, an article can comprise an epoxy composition which comprises the reaction product of a curing agent composition and an epoxy composition. Articles of manufacture produced from epoxy compositions disclosed herein include, but are not limited to adhesives, composite, electronics, coatings, primers, sealants, curing compounds, construction products, flooring products, and composite products. Further, such adhesive, coatings, primers, sealants, or curing compounds can be applied to metal or cementitious substrates. Coatings based on these epoxy compositions can be solvent-free or can contain diluents, such as water or organic solvents, as needed for the particular application. Coatings can contain various types and levels of pigments for use in paint and primer applications. Epoxy coating compositions comprise a layer having a thickness ranging from 40 to 400 μm (micrometer), preferably 80 to 300 μm, more preferably 100 to 250 μm, for use in a protective coating applied onto metal substrates. In addition, for use in a flooring product or a construction product, coating compositions comprise a layer having a thickness ranging from 50 to 10,000 μm, depending on the type of product and the required end-properties. A coating product that delivers limited mechanical and chemical resistances comprises a layer having a thickness ranging from 50 to 500 μm, preferably 100 to 300 μm; whereas a coating product such as, for example, a self-leveling floor that delivers high mechanical and chemical resistances comprises a layer having a thickness ranging from 1,000 to 10,000 μm, preferably 1,500 to 5,000 μm.

Numerous substrates are suitable for the application of adhesives, coatings or sealants of the present disclosure with proper surface preparation, as is well known to one of ordinary skill in the art. Such substrates include, but are not limited to, concrete and various types of metals and alloys, such as steel and aluminum. Coatings of the present disclosure are suitable for the painting or coating of large metal objects or cementitious substrates including ships, bridges, industrial plants and equipment, and floors.

Coatings of this invention can be applied by any number of techniques including spray, brush, roller, paint mitt, and the like. In order to apply very high solids content or 100% solids coatings of the present disclosure, plural component spray application equipment can be used, in which the amine and epoxy components are mixed in the lines leading to the spray gun, in the spray gun itself, or by mixing the two components together as they leave the spray gun. Using this technique can alleviate limitations with regard to the pot life of the formulation, which typically decreases as both the amine reactivity and the solids content increases. Heated plural component equipment can be employed to reduce the viscosity of the components, thereby improving ease of application.

Construction and flooring applications include compositions comprising the epoxy compositions of the present disclosure in combination with concrete or other materials commonly used in the construction industry. Applications of compositions of the present disclosure include, but are not limited to composition's use as a primer, a deep penetrating primer, a coating, a curing compound, and/or a sealant for new or old concrete, such as referenced in ASTM C309-97, which is incorporated herein by reference. As a primer or a sealant, the epoxy compositions of the present disclosure can be applied to surfaces to improve adhesive bonding prior to the application of a coating. As it pertains to concrete and cementitious application, a coating is an agent used for application on a surface to create a protective or decorative layer or a coat. Crack injection and crack filling products also can be prepared from the compositions disclosed herein. Epoxy compositions of the present disclosure can be mixed with cementitious materials, such as, concrete mix to form polymer or modified cements, tile grouts, and the like. Non-limiting examples of composite products or articles comprising epoxy compositions disclosed herein include tennis rackets, skis, bike frames, airplane wings, glass fiber reinforced composites, and other molded products.

In a particular use of the present disclosure these curing agent compositions will have applicability in making resin transfer molding composites such as lightweight car parts, infusion composites such as windmill blades, aerospace adhesives, industrial adhesives, as well as other related applications. A composite is a material made of different substances, and in the case of resin technologies, composites refer to resin impregnated systems where the resin is reinforced by the addition of reinforcing materials, such as, fillers and fibers for improving general properties of the resulting product. These materials work together but are not soluble in one another. In the present case, the binder component comprises the epoxy resin and epoxy curing agent(s). There are many types of composite applications, such as, prepegs, laminates, filament windings, braiding, pultrusion, wet lay and infusion composites. Resin infusion, or resin transfer, is a process by which precursor is introduced to the composite mold, the reinforcement material having already been placed into the mold and closed prior to precursor introduction. There are variations on this process, such as, those that are vacuum assisted or high pressure injection. The hot fast cure composition will facilitate the manufacturing of composites by reducing the cycle time.

The uses of epoxy resins which are cured, hardened, and/or crosslinked with amine-based curing agents are well known. These epoxy materials are widely used in applications, ranging from coatings, where they can be used in various applications such as primers, tie-coats, and finishes. They can be applied on many substrates. They can be used in laminates, adhesives, floorings, dust free finishes, secondary containment, linings, reinforcement, repair formulations, tooling, potting, and casting. They can be used in many industries like industrial equipment (maintenance and repairing), automotive (parts bonding, composites manufacturing), electronic (wafer back bonding, printed circuit base, potting of electronic components, wire insulation, parts fixture), consumer (DIY adhesive, furniture repairing, rapid fixturing sealer), sports (tennis rackets, golf clubs, canoes, skis), marine applications (parts bonding or quick repairing), aeronautic (gluing of parts, honeycomb reinforcement for cabin structure, re-entry shield for satellites), and many mores applications such as filament winding for containers and tanks, laminates for wind energy and propellers for planes, syntactic foams, and many other applications which are well known to those skilled in the art.

The present disclosure also includes articles of manufacture comprising an epoxy composition, as described above. Such articles can include, but are not limited to an adhesive, a coating, a primer, a sealant, a curing compound, a construction product, a flooring product, a composite product, laminate, potting compounds, grouts, fillers, cementitious grouts, or self-leveling flooring. Additional components or additives can be used together with the compositions of the present disclosure to produce articles of manufacture. Further, such coatings, primers, sealants, curing compounds or grouts can be applied to metal or cementitious substrates.

The disclosure is further illustrated by the following examples, which are not to be construed as imposing limitations to the scope of this invention. Various other aspects, embodiment, modifications, and equivalents thereof which, after reading the description herein, may suggest themselves to one of ordinary skill in the art without departing from the spirit of the present disclosure or the scope of the appended claims.

EXAMPLES

The following synthesis examples are provided to illustrate certain aspects or embodiments of the instant invention and shall not limit the scope of the claims appended hereto. General Process Procedure for Preparation of (ii) Room Temperature Ionic Liquid:

1 mole amine and 60 ml n-Butanol were charged to a four-neck round bottom flask equipped with an overhead mechanical stirrer, nitrogen inlet, dropping funnel and thermocouple. The reactant was stirred and purged with highly pure nitrogen for 0.5 hrs. After that, 1 mole acid dissolved in 200-mL n-Butanol were slowly dropped to maintain the temperature no higher than 70° C. during dropping. The reaction was further carried out at 80° C. for 2 hrs and then gradually increase temperature to 110° C. meanwhile vacuum was applied to distill the n-butanol and the water involved from p-TSA. After holding for 1-2 hrs under high vacuum, a sample was collected and subjected to water content test. Once the water content meted the spec, the result amine salt was cooled to room temperature and a viscous yellow liquid was obtained.

Example 1. Synthesis of (TEPA/p-TSA 1:1 Mole Ratio) Room Temperature Ionic Liquid 149 g tetraethylenepentamine (TEPA) and 40 ml n-Butanol were charged to a four-neck round bottom flask equipped with an overhead mechanical stirrer, nitrogen inlet, dropping funnel and thermocouple. The reactant was stirred and purged with highly pure nitrogen for 0.5 hrs. After that, 150 g p-Toluenesulfonic acid (p-TSA) dissolved in 160-mL n-Butanol were slowly dropped to maintain the temperature no higher than 70° C. The reaction was further carried out at 80° C. for 2 hrs and then gradually increase temperature to 110° C. meanwhile vacuum was applied to distill the n-butanol and the water involved from p-TSA. After holding for 1-2 hrs under high vacuum, a sample was collected and subjected to water content test. Once the water content met the spec (i.e. less than 1%), the result amine salt was cooled to room temperature and a viscous fluorescent yellow liquid was obtained.

Example 2. Synthesis of (PEHA/p-TSA 1:1 Mole Ratio) Room Temperature Ionic Liquid Example 2 follows the process of Example 1 except, 348.6 g pentaethylenehexamine (PEHA) react with 285.2 g p-Toluenesulfonic acid (p-TSA) $H_2O$ in present of n-Butanol as solvent and result a viscous brown color liquid.

Example 3. Synthesis of (Am4/p-TSA 1:1 Mole Ratio) Room Temperature Ionic Liquid Example 3 follows the process of Example 1, except, 261.4 g N,N'-bis(3-aminopropyl) ethylenediamine (Am4) react with 285.2 g p-TSA·$H_2O$ in present of n-Butanol as solvent and result a viscous light color liquid.

Example 4. Synthesis of (Am4/SA 1:1 Mole Ratio) Room Temperature Ionic Liquid Example 4 follows the process of Example 1, except, 261.4 g Am4 react with 207.0 g salicylic acid (SA) in present of n-Butanol as solvent and result a light color liquid with mid viscosity (i.e. 1,000-10,000 cps).

Example 5. Synthesis of (Am4/TFMSA 1:1 Mole Ratio) Room Temperature Ionic Liquid Example 5 follows the process of Example 1, except, 261.4 g Am4 react with 225.1 g Trifluoromethanesulfonic acid (TFMSA) in present of n-Butanol as solvent and result a light color liquid with mid viscosity.

TABLE 1

Synthesis summary of room temperature ionic liquids

| Cation/Anion | Acid/amine mole ratio | Acid content wt | Viscosity at 25° C. (cps) | Amine Value (mgKOH/g) |
|---|---|---|---|---|
| TEPA/P-TSA | 1:1 | 47.6% | 99,000 | 570 |
| PEHA/P-TSA | 1:1 | 42.6% | 175,000 | 580 |
| Am4/P-TSA | 1:1 | 49.7% | 39,000 | 478 |
| Am4/SA | 1:1 | 44.2% | 2,160 | 863 |
| Am4/TFMSA | 1:1 | 46.2% | 7,630 | 542 |

Example 6. Ambient Fast Cure Composition

The epoxy curing agent made up of 72 parts of Example 1 and 28 parts of benzyl alcohol is provided. ANCAMINE® 1637Iv and ANCAMINE® 1767 used in the comparison example (available from Air Products & Chemicals, Inc.). The results are shown in TABLE 2.

TABLE 2

Test summary of Example 6 ambient fast cure composition

| Resin | | | |
|---|---|---|---|
| E331 | | 100 | |
| Epoxy EEW | | 190.0 | |
| Curing agent | Example composition 1 | Mannich base cure agent | Accelerated amine |
| Example 1 | 72 | | |
| ANCAMINE ® 1637LV | | 100 | |
| ANCAMINE ® 1767 | | | 100 |
| Benzyl alcohol | 28 | | |
| Subtotal % | 100 | 100 | 100 |
| Curing agent AHEW | 73.3 | 50.0 | 190.0 |
| Actual ratio | 50 | 26 | 100 |
| Strength build up at 25° C. | | | |
| LSS 2 h | 5.7 | 7.7 | 3.4 |
| LSS 4 h | 21.0 | 12.5 | 9.0 |
| LSS 6 h | 19.5 | 12.6 | 8.5 |
| LSS 24 h | 14.4 | 17.3 | 13.2 |
| Tensile Stress (MPa) 4 h | 15.1 | 3.3 | 10.8 |
| Tensile Elongation (%) 4 h | 71.0 | 0.1 | 200.0 |
| Tensile Modulus (MPa) 4 h | 527.0 | 4780.0 | 13.0 |
| Tensile Stress (MPa) 1 week | 75.9 | 65.6 | 28.9 |
| Tensile Elongation (%) 1 week | 4.1 | 2.0 | 44.1 |
| Tensile Modulus (MPa) 1 week | 3480 | 3809 | 1706 |

Example 7. Hot Fast Cure Composition

A cure agent is composing 72 parts of Example 3 and 28 parts of AMICURE PACM is provided. AMICURE PACM is a trademark of Air Products & Chemicals, Inc. identifying PACM. The results are shown in TABLE 3 and the FIGURE.

TABLE 3

Test summary of Example 7 hot fast cure composition.

| Resin | % |
|---|---|
| DER 331 | 100 |
| Subtotal % | 100 |
| Epoxy EEW | 190.0 |
| Curing agent | % |
| Example 3 | 72 |
| Amicure ® PACM | 28 |
| Subtotal % | 100 |
| Curing agent AHEW | 49.5 |
| Actual ratio | 26 |
| Result | |
| Tg 2nd scan (° C.) | 126.9 |
| Gel time (25° C., 20 g) | ~3.0 min |
| Cure condition | 120° C., 30 min |
| Tensile Stress (MPa) | 83.1 |
| Tensile Elongation (%) | 5.36 |
| Tensile Modulus (MPa) | 3350 |

The FIGURE shows isothermal scan of Example 7 by DSC. For scan of Example 7 by DSC, the bisphenol A diglycidyl ether DER 331 was mixed with cure agent and then analyzed by DSC (TA Instruments QA2000) using a program that jumps to 120° C. then isothermal for 15 min. The cured sample of Example 7 was scanned using above same program and used as baseline file.

ASTM standard methods were used to determine the gel time, lap share strength and also the tensile properties, as listed in TABLE 4. The gel time characterizes the time a composition transitions from a liquid to a gel. The gel time of the amine-epoxy compositions was measured with a TECHNE gelation timer model FGT 6 using ASTM D2471. The lap share Specimens are prepared according to ASTM D1002, the substrate used for LSS is sanded cold rolled steel and the crosshead speed is 2 mm/min. The tensile specimens are prepared according to ASTM D638.

TABLE 4

Test Methods

| Property | Response | Test Method |
|---|---|---|
| Gel time | 150 gram sample | ASTM D2471 |
| Viscosity | Brookfield RVTD, Spindle 4 | ASTM D445 |
| Amine value | Perchloric Acid Titration | ISO 9702 |
| Lap Shear Strength | | ASTM D 1002 |
| Mechanical property | Tensile strength/modulus/elongation | ASTM D 638 |
| Glass transition temperature | Tg $2^{nd}$ scan | ASTM E1356 |

While the invention has been described with reference to certain aspects or embodiments, it will be understood by those skilled in the art that various changes may be made and equivalents may be substituted for elements thereof without departing from the scope of the invention. In addition, many modifications may be made to adapt the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An epoxy curing agent comprising at least one room temperature ionic liquid salt, the room temperature ionic liquid salt being a reaction product of:
   (a) at least one polyalkylene polyamine compound represented by formula (I):

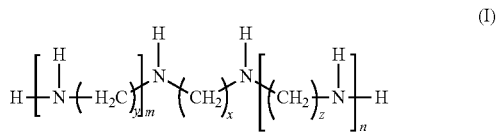

wherein x, y, and z are integers of 2 and 3, m and n are integers of 1-3; and
   (b) an organic acid having pka less than 6; wherein the at least one polyalkylene polyamine compound comprises a mixture of dissimilar polyalkylene polyamine compounds selected from the group consisting of N,N'-bis(3-aminopropyl)ethylenediamine and N,N,N'-tris(3-aminopropyl)ethylenediamine, wherein the at least one polyalkylene polyamine compound further comprises a derivative of polyalkylene polyamine, wherein the derivative of polyalkylene polyamine is one or more compounds selected from alkylated polyalkylene polyamine, benzylated polyalkylene polyamine, hydroxyalkylated polyalkylene polyamine, and polyalkylene polyamine adduct, and wherein the reaction of the reaction product proceeds at a reaction temperature of 65° C. to 110° C. for 3 to 7 hours.

2. The epoxy curing agent of claim 1, wherein the organic acid is selected from the group consisting of p-toluenesulfonic acid, trifluoromethanesulfonic acid, fluorosulfuric acid, salicylic acid, trifluoroacetic acid, 2-ethylhexanoic acid; tetrafluoroboric acid; thiocyanic acid; and combinations thereof.

3. The epoxy curing agent of claim 1, wherein the molar ratio of component (b) to component (a) in a reaction mixture forming the reaction product is from greater than 0 to 1.8.

4. The epoxy curing agent of claim 1, wherein the molar ratio of component (b) to component (a) in a reaction mixture forming the reaction is from 0.3 to 1.3.

5. The epoxy curing agent of claim 1, further comprising a second amine, the second amine being a primary amine, a secondary amine, a tertiary amine, a quaternary amine, or derivative thereof.

6. The epoxy curing agent of claim 5, wherein the second amine is a compound selected from the group consisting of aminoethylpiperazine, isophoronediamine, 4,4'-Methylenebis(cyclohexylamine), Ether amine, and combinations thereof.

7. A curable epoxy-based composition comprising:
(i) at least one epoxy resin; and
(ii) an epoxy curing agent comprising at least one room temperature ionic liquid salt, the room temperature ionic liquid salt being a reaction product of:
(a) at least one polyalkylene polyamine compound represented by formula (I):

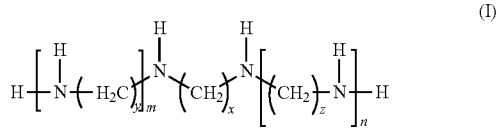

wherein x, y, and z are integers of 2 and 3, m and n are integers of 1-3; and
(b) an organic acid having pKa less than 6; wherein the at least one polyalkylene polyamine compound comprises a mixture of dissimilar polyalkylene polyamine compounds selected from the group consisting of N,N'-bis (3-aminopropyl)ethylenediamine and N,N,N'-tris(3-aminopropyl)ethylenediamine, wherein the at least one polyalkylene polyamine compound further comprises a derivative of polyalkylene polyamine, wherein the derivative of polyalkylene polyamine is one or more compounds selected from alkylated polyalkylene polyamine, benzylated polyalkylene polyamine, hydroxyalkylated polyalkylene polyamine, and polyalkylene polyamine adduct, and wherein the reaction of the reaction product proceeds at a reaction temperature of 65° C. to 110° C. for 3 to 7 hours.

8. The curable epoxy-based composition of claim 7, wherein the at least one epoxy resin includes compounds selected from the group consisting of bisphenol-A diglycidyl ethers, bisphenol-F diglycidyl ethers, and epoxy novolacs.

9. The curable epoxy-based composition of claim 7, further comprising (iii) a second amine, the second amine being a primary amine, a secondary amine, a tertiary amine, a quaternary amine, or derivative thereof.

10. The curable epoxy-based composition of claim 9, wherein the (iii) second amine is a compound selected from the group consisting of aminoethylpiperazine, isophoronediamine, 4,4'-Methylenebis(cyclohexylamine), Ether amine, and combinations thereof.

11. The curable epoxy-based composition of claim 7, further comprising (iv) at least one modifier selected from the group consisting of benzyl alcohol, furfuryl alcohol, polyethylene glycol and combinations thereof.

12. The curable epoxy-based composition of claim 11, further comprising (v) an acrylate.

13. The curable epoxy-based composition of claim 12, wherein the (v) acrylate is selected from the group consisting of lauryl acrylate, 1,6-hexanediol diacrylate, trimethylolpropanetriacrylate, poly(alkylene oxide) diacrylate, polyurethane diacrylate and combinations thereof.

14. A method for forming a cured epoxy comprising mixing the curable epoxy-based composition according to claim 7.

15. A cured epoxy resin comprising the contact product of the curable epoxy-based composition of claim 7.

16. An article obtained from the composition of claim 7.

17. The article of claim 16, wherein the article is an adhesive, a coating, a primer, a sealant, a curing compound, a construction product, a flooring product, or a composite product.

18. The composition of claim 1 wherein the mixture of dissimilar polyalkylene polyamine compounds is selected from (i) bis(3-aminopropyl) ethylenediamine and N,N,N'-tris(3-aminopropyl) ethylenediamine, (ii) bis(3-aminopropyl) ethylenediamine and triethylenetetramine, and (iii) bis (3-aminopropyl) ethylenediamine and tetraethylenepentamine.

19. An epoxy curing agent comprising at least one room temperature ionic liquid salt, the room temperature ionic liquid salt being a reaction product of:
(a) at least one polyalkylene polyamine compound represented by formula (I):

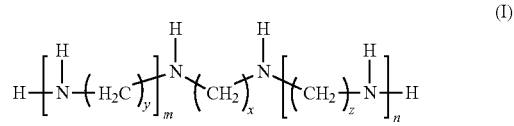

wherein x, y, and z are integers of 2 and 3, m and n are integers of 1-3; and
(b) an organic acid having pKa less than 6; wherein the at least one polyalkylene polyamine compound comprises a mixture of dissimilar polyalkylene polyamine compounds selected from the group consisting of N,N'-bis (3-aminopropyl)ethylenediamine and N,N,N'-tris(3-aminopropyl)ethylenediamine, and wherein the reaction of the reaction product proceeds at a reaction temperature of 65° C. to 110° C. for 3 to 7 hours.

* * * * *